(12) United States Patent
Kodama et al.

(10) Patent No.: US 10,564,528 B2
(45) Date of Patent: Feb. 18, 2020

(54) IMAGE PROJECTION APPARATUS INCLUDING LIGHT MODULATION ELEMENTS

(71) Applicant: CANON KABUSHIKI KAISHA, Tokyo (JP)

(72) Inventors: Hiroyuki Kodama, Utsunomiya (JP); Takehito Kawasumi, Saitama (JP); Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/059,583

(22) Filed: Aug. 9, 2018

(65) Prior Publication Data

US 2019/0049825 A1    Feb. 14, 2019

(30) Foreign Application Priority Data

Aug. 10, 2017    (JP) ................... 2017-154904

(51) Int. Cl.
*G03B 21/00* (2006.01)
*H04N 9/31* (2006.01)
(Continued)

(52) U.S. Cl.
CPC .......... *G03B 21/005* (2013.01); *G02B 27/09* (2013.01); *G03B 21/006* (2013.01);
(Continued)

(58) Field of Classification Search
CPC .. G03B 21/006; G03B 21/2033; G09G 3/002; G09G 3/3611; G09G 2310/0232;
(Continued)

(56) References Cited

U.S. PATENT DOCUMENTS 7,551,341 B1    6/2009  Ward et al.
8,109,636 B2    2/2012  Ogawa
(Continued)

FOREIGN PATENT DOCUMENTS

EP    1871118 A2    12/2007
JP    2008003215 A    1/2008
(Continued)

OTHER PUBLICATIONS

Combined Search and Examination Report issued in GB Application No. 1812810.8 dated Feb. 7, 2019.

*Primary Examiner* — Cara E Rakowski
*Assistant Examiner* — Magda Cruz
(74) *Attorney, Agent, or Firm* — Rossi, Kimms & McDowell LLP

(57) ABSTRACT

An image projection apparatus includes a first light modulation element configured to modulate a first light emitted from a light source and to generate a second light, and a second light modulation element configured to modulate the second light. The first light modulation element is configured to receive the first light onto a modulable pixel area that can modulate the first light, the modulable pixel area including an effective pixel area that can modulate the first light and a peripheral pixel area arranged at the periphery of the effective pixel area. The image projection apparatus further comprises a controller configured to control pixels of the peripheral pixel area such that light from the peripheral pixel area does not reach the second light modulation element.

8 Claims, 3 Drawing Sheets

(51) Int. Cl.
  *G02B 27/09* (2006.01)
  *G03B 21/20* (2006.01)
  *G09G 3/00* (2006.01)
(52) U.S. Cl.
  CPC ......... *G03B 21/2033* (2013.01); *G09G 3/002* (2013.01); *H04N 9/31* (2013.01); *H04N 9/3155* (2013.01)
(58) Field of Classification Search
  CPC .. H04N 9/3126; H04N 9/3155; H04N 9/3188; H04N 9/3194; H04N 9/31; G02B 27/09
  See application file for complete search history.

(56) References Cited

U.S. PATENT DOCUMENTS

| | | | |
|---|---|---|---|
| 9,478,193 B2 | 10/2016 | Richards | |
| 2003/0122972 A1* | 7/2003 | Nelson | H04N 9/3105 348/745 |
| 2003/0123031 A1* | 7/2003 | Nelson | H04N 9/3105 353/31 |
| 2014/0313448 A1* | 10/2014 | Kinoe | G02F 1/136209 349/46 |
| 2017/0013257 A1 | 1/2017 | Richards | |

FOREIGN PATENT DOCUMENTS

| | | |
|---|---|---|
| JP | 2014191158 A | 10/2014 |
| JP | 2016133633 A | 7/2016 |

\* cited by examiner

IMAGE PROJECTION APPARATUS INCLUDING LIGHT MODULATION ELEMENTS

BACKGROUND OF THE INVENTION

Field of the Invention

The present invention relates to an image projection apparatus (projector).

Description of the Related Art

Some projectors modulate, reflect, and project onto a target plane, such as a screen, illumination light from a light source by using a reflection type light modulation element (reflection type liquid crystal panel). Use of the reflection type light modulation element may degrade a projected image because the illumination light irradiated onto an ineffective area outside the effective pixel area in the light modulation element which modulates the illumination light for image projections is also reflected and projected onto the target plane.

As a solution for this problem, a projector disclosed in Japanese Patent Laid-Open No. ("JP") 2008-003215 includes a light shield plate having an opening at a position conjugate with a light modulation element and a mechanism for adjusting the position of the light shield plate such that the illumination light that has passed the opening enters only the effective pixel area in the light modulation element.

However, the light shield plate that receives light from the light source in the projector disclosed in JP 2008-003215 may thermally deform and cause the illumination light to be irradiated onto the ineffective area. In addition, the mechanism for adjusting the position of the light shield light complicates the structure.

SUMMARY OF THE INVENTION

The present invention provides an image projection apparatus with a simple structure that can reduce light projected from the outside of an effective pixel area in a light modulation element.

An image projection apparatus according to one aspect of the present invention includes a first light modulation element configured to modulate a first light emitted from a light source and to generate a second light, and a second light modulation element configured to modulate the second light. The first light modulation element is configured to receive the first light onto a modulable pixel area that can modulate the first light, the modulable pixel area including an effective pixel area that can modulate the first light and a peripheral pixel area arranged at the periphery of the effective pixel area. The image projection apparatus further comprises a controller configured to control pixels of the peripheral pixel area such that light from the peripheral pixel area does not reach the second light modulation element.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
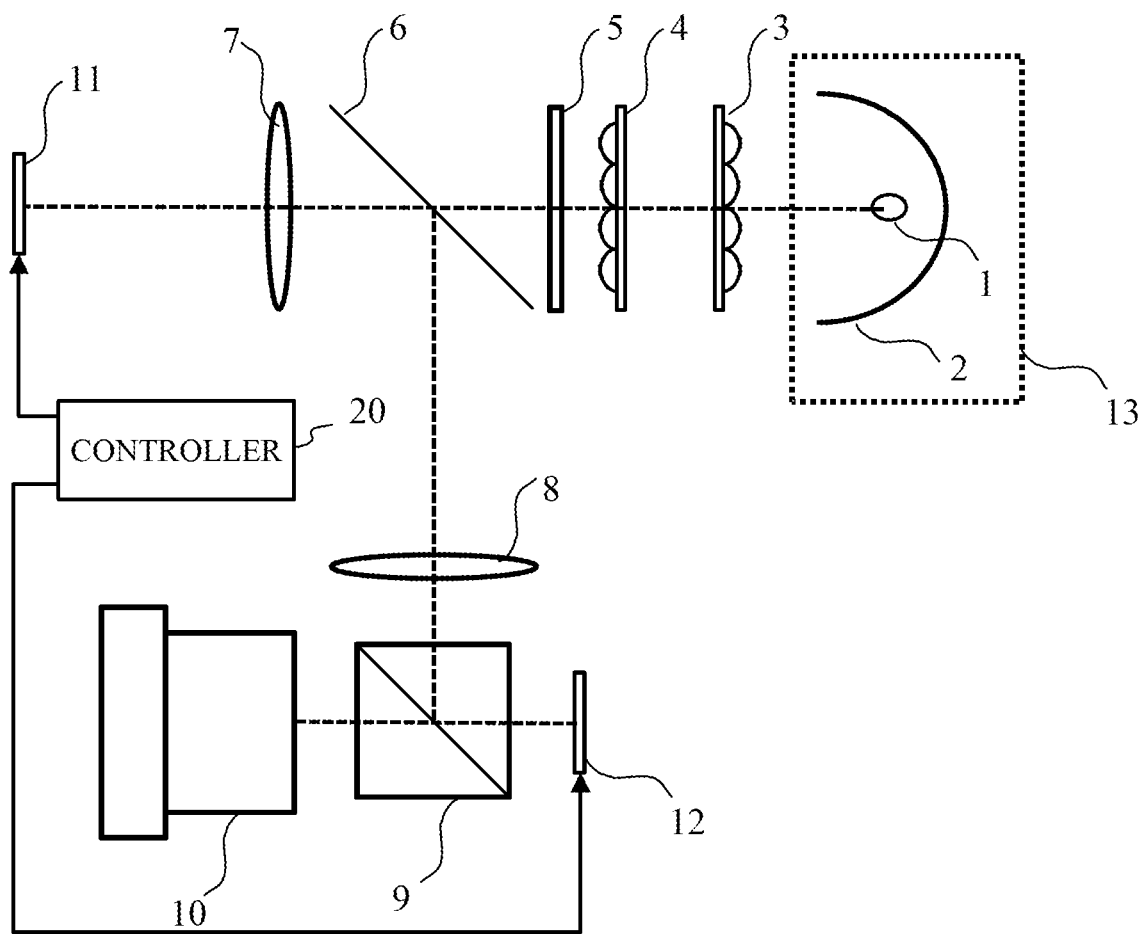
FIG. 1 is a sectional view of a structure of an optical system in a projector according to a first embodiment of the present invention.

FIG. 1 illustrates an entire optical system in a projector as an image projection apparatus according to a first embodiment according to the present invention. The projector displays a projected image based on an input image signal supplied from an image supplying apparatus, such as an unillustrated personal computer. The optical system includes an illumination optical system for illuminating a first light modulation element 11 with illumination light (first light) from a light source unit 13, and an image optical system for imaging luminance modulated light (second light) having the luminance modulated by the first light modulation element 11 on a second light modulation element 12. This embodiment uses a reflection type liquid crystal panel for each of the first and second light modulation elements 11 and 12.

The light source unit 13 includes a light source 1 such as an ultrahigh pressure mercury lamp and a Xenon lamp, and a reflector 2 for reflecting light from the light source 1. The light source unit 13 may use a LED and a laser. Alternatively, this embodiment may use a light source unit that uses a fluorescent body to be excited by a laser beam and emits the fluorescent light.

The illumination optical system includes a first fly-eye lens 3, a second fly-eye lens 4, a polarization conversion element 5, a first polarization beam splitter ("PBS") 6, and a first lens system 7. The imaging optical system images the luminance modulated light from the first light modulation element 11 onto the second light modulation element 12, and includes a first lens system 7 and a second lens system 8.

The illumination light from the light source unit 13 is divided into a plurality of light fluxes by the first fly-eye lens 3 and each light flux is condensed. The plurality of light fluxes pass the second fly-eye lens 4, and form a plurality of light source images. The polarization conversion element 5 is located near a position at which the light source image is formed.

A plurality of light source fluxes as nonpolarized light incident on the polarization conversion element 5 are converted into polarized light (P-polarized light herein) having a specific polarization direction by the polarization conversion element 5, and enter the first PBS 6. The P-polarized light that has transmitted the first PBS 6 is condensed by the first lens system 7, reaches and illuminates the first light modulation element 11. The first light modulation element 11 is driven based on the above input image signal, modulates the illumination light, generates and reflects the luminance modulated light.

The luminance modulated light (S-polarized light) emitted from the first light modulation element 11 is condensed by the first lens system 7, reflected by the first PBS 6, condensed by the second lens system 8, reflected by a second PBS 9, and imaged on the second light modulation element 12. The light (P-polarized light) that is not luminance-modulated by the first light modulation element 11 transmits through the first PBS 6 and returns to the light source unit side.

The second light modulation element 12 is driven based on the above input image signal, modulates the luminance modulated light, generates and reflects image light. The image light (P-polarized light) emitted from the second light modulation element 12 transmits the second PBS 9, and is projected on a target plane, such as an unillustrated screen, by the projection lens 10. The light (S-polarized light) that is not modulated by the second light modulation element 12 is reflected on the second PBS 9 and returns to the light source unit side.

In the projector according to this embodiment, the first light modulation element 11 controls the luminance level of the incident light (luminance modulated light) for each image area in the second light modulation element 12, and the second light modulation element 12 controls the luminance level of the emitted light (image light) for each pixel. This two-stage control of the light luminance level can provide a high contrast and multiple gradations. For example, assume that the contrast realized by the first PBS 6 and the first light modulation element 11 is 200:1, and the contrast ratio realized by the second PBS 9 and the second light modulation element 12 is 5000:1. Then, the projector can realize the contrast of 1000000:1.

In this case, the imaging optical system that includes the first lens system 7 and the second lens system 8 constitutes a telecentric optical system on both sides of the first light modulation element side and the second light modulation element side. The imaging magnification of this imaging optical system is set such that the image of the first light modulation element 11 formed by the luminance modulated light is reduced and projected on the second light modulation element 12. Thereby, the panel size of the first light modulation element 11 can be larger than that of the second light modulation element 12, and the area in the first light modulation element 11 which the illumination light enters can be larger than that in the second light modulation element 12 which the luminance modulated light enters. This is because the light density of the first light modulation element 11 which the illumination light enters is lower than that of the second light modulation element 12 which the luminance modulated light from the first light modulation element 11 (with the reflectance of about 60% to 80%) enters. In general, the life of the light modulation element shortens as the light density becomes higher. Thus, the life of the first light modulation element 11 is prevented from being shorter than that of the second light modulation element 12 by reducing the light density on the first light modulation element 11. In other words, the durability of the projector can be improved.

Figure 2:
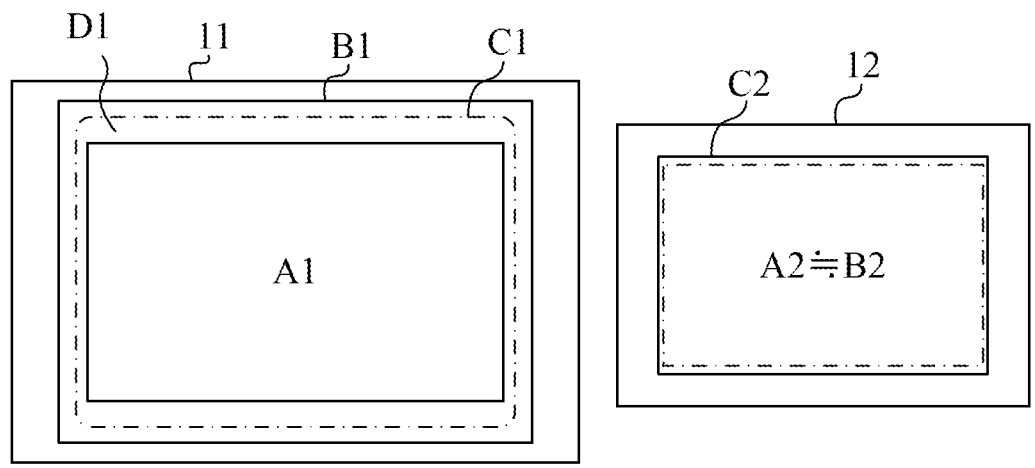
FIG. 2 illustrates a first light modulation element and a second light modulation element according to this embodiment.

FIG. 2 schematically illustrates a size relationship between the first light modulation element 11 and the second light modulation element 12 and a relationship between a modulable pixel area and an effective pixel area. On the left side in FIG. 2, B1 denotes the modulable pixel area in the first light modulation element 11, and A1 denotes the effective pixel area inside the modulable pixel area B1. An area C1 illustrated by an alternate long and short dash line denotes a light incident area in the modulable pixel area B1 which the illumination light enters. The light incident area C1 is set wider than the effective pixel area A1 to some extent. On the right side in FIG. 2, B2 denotes the modulable pixel area in the second light modulation element 12, and A2 denotes an effective pixel area set as large as or slightly narrower than the modulable pixel area B2. In the second light modulation element 12, the luminance modulated light from the first light modulation element 11 enters a light incident area C2 as large as or slightly wider than the effective pixel area A2.

When the effective pixel area A2 in the second light modulation element 12 is reversely projected onto the first light modulation element 11 via the imaging optical system (7, 8), an area in which a (conjugate) image is formed corresponds to the effective pixel area A1 in the first light modulation element 11.

Due to the manufacturing accuracies and arrangement accuracies in the lens and other optical elements in the imaging optical system, the luminance modulated light from the effective pixel area A1 in the first light modulation element 11 may shift from and enter the effective pixel area A2 in the second light modulation element 12. Then, the position of the effective pixel area A1 in the first light modulation element 11 is moved (changed) in the light incident area C1 widely set in the modulable pixel area B1 so as to correct the shift. As a result, it is unnecessary to maintain the manufacturing accuracies and arrangement accuracies in the lens and other optical elements in the image optical system, and a high contrast can be realized with a simple electric control.

This configuration, however, causes the illumination light to enter at least part of pixels (peripheral pixels hereinafter) in a peripheral area (peripheral pixel area) D1 outside the effective pixel area A1 in the modulable pixel area B1 in the first light modulation element 11. In other words, the light incident area C1 contains the peripheral pixels in addition to the pixels in the effective pixel area A1. The peripheral area is arranged at the periphery of the effective pixel area. When the illumination light (unnecessary reflected light) reflected on the peripheral pixels is projected on the target plane via the second light modulation element 12 and the projection lens 10, the quality of the projected image degrades.

Accordingly, this embodiment controls the peripheral pixels in the first light modulation element 11 such that the illumination light entering and reflected on the peripheral pixels can be "unmodulated light (P-polarized light)." Thereby, the light reflected on the peripheral pixels transmits the first PBS 6 (polarization separator or splitter) and returns to the light source unit side. In other words, this embodiment controls the peripheral pixels in the first light modulation element 11 such that the illumination light from the peripheral pixels does not reach the second light modulation element 12 (the effective pixel area A2 and frame part outside it). More specifically, this embodiment controls the peripheral pixels such that the peripheral pixels can be in the black display state.

This configuration can solve the problems in which when the reflection type light modulation element used as the first light modulation element 11 causes the unnecessary reflected light to be projected on the target plane and the image quality to lower.

Figure 4:
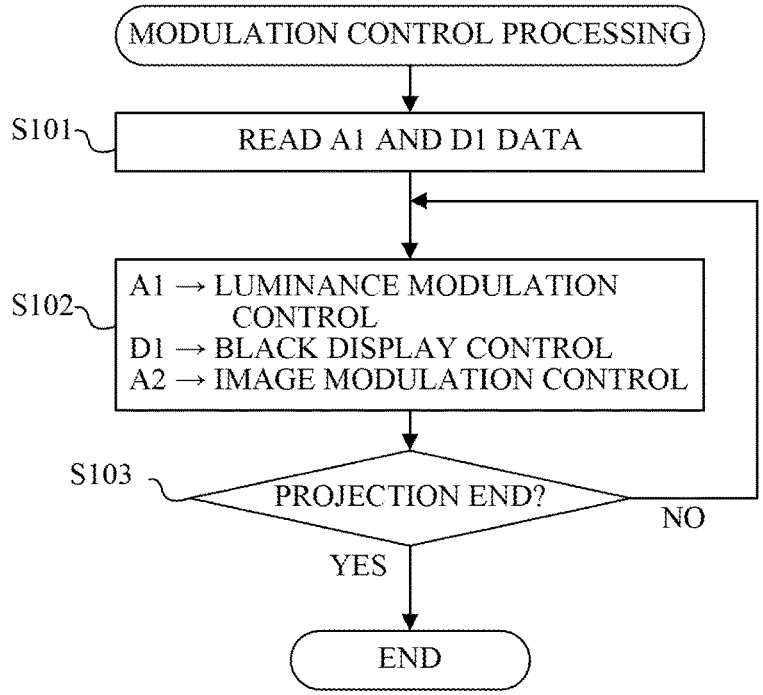
FIG. 4 is a flowchart of modulation control processing executed for the first light modulation element in the projector according to this embodiment.

A controller 20 as a computer illustrated in FIG. 1 executes modulation control processing as a computer program in accordance with a flowchart in FIG. 4. An unillustrated memory stores position data of the effective pixel area A1 and the peripheral pixels (area D1) in the first light modulation element 11 in the calibration in a factory of the projector.

In the step ("S" in FIG. 4) 101, the controller 20 reads the position data of the effective pixel area A1 and the peripheral pixels (area D1) from the memory.

Next, in the step 102, the controller 20 controls the pixels in the effective pixel area A1 in the first light modulation element 11 so as to modulate the luminance of the illumination light based on the input image signal in response to the start trigger of the image projection. The controller 20 controls the peripheral pixels in the first light modulation element 11 so as to make them in the black display state. Moreover, the controller 20 controls the pixels in the effective pixel area A2 in the second light modulation element 12 for the image modulation of the luminance modulated light.

The controller 20 continues the step 102 until the end trigger of the image projection issues in the step 103, and ends this processing in response to the end trigger.

Figure 5:
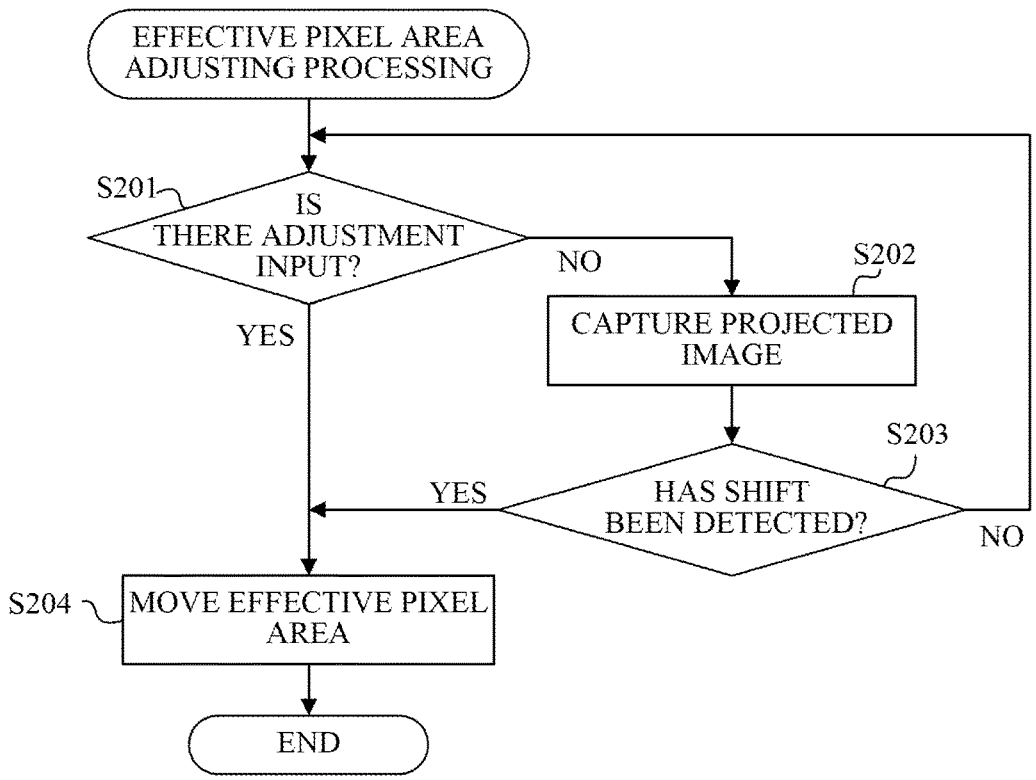
FIG. 5 is a flowchart of effective pixel area adjusting processing executed for the first light modulation element in the projector according to this embodiment.

A flowchart in FIG. 5 illustrates effective pixel area adjusting processing for moving the effective pixel area A1 within the modulable area B1 (light incident area C1) in the first light modulation element 11 as described above. The controller 20 as a changer executes this processing through the computer program. This embodiment describes a case where the projector includes an unillustrated operating unit through which a user can input a command (adjustment command) for moving the effective pixel area A1 and an unillustrated camera that can capture the projected image.

In the step 201, the controller 20 determines whether the adjustment command is input from the operating unit. When the adjustment command is input, the flow moves to the step 204, and when the adjustment command is not input, the flow moves to the step 202.

In the step 202, the controller 20 captures the projected image through the camera. In the next step 203, the controller 20 compares the captured projected image and the image (input image) expressed by the input image signal with each other, and determines whether there is a defect in the input image near upper, lower, left, and right ends in the projected image. The controller 20 returns to the step 201 when there is no defects, and proceeds to the step 204 when there is the defect, so as to calculate the moving direction and the moving amount of the effective pixel area A1 necessary to correct the defect.

In the step 204, the controller 20 moves the effective pixel area A1 within the modulable area B1 in the first light modulation element 11 in accordance with the moving direction and the moving amount corresponding to the adjustment command obtained in the step 201 or calculated in the step 203. Then, this processing ends.

The effective pixel area A1 in the first light modulation element 11 may be similar to the effective pixel area A2 in the second light modulation element 12. The similarity may fall within a permissible range as well as being completely similar. Assume that the effective pixel area A1 in the first light modulation element 11 has a long side of x1 and a short side of y1 and the effective pixel area A2 in the second light modulation element 12 has a long side of x2 and a short side of y2. Then, the complete similarity is met when $y1/x1=y2/x2$ is satisfied. The permissible similarity is met when $0.8 \le (y1/x1)/(y2/x2) \le 1.2$ is satisfied. The effective pixel area A1 in the first light modulation element 11 and the effective pixel area A2 in the second light modulation element 12 may not be similar to each other.

An electric circuit substrate for driving the first light modulation element 11 can be made smaller by using a liquid crystal panel for the first light modulation element 11 which has a resolution lower than that of the second light modulation element 12 as in this embodiment. In addition, the black matrix in the first light modulation element 11 can be made less conspicuous (hardly visible). On the other hand, as the resolution of the first light modulation element 11 becomes higher, the position adjustment of the luminance modulated light can be finer from the effective pixel area A1 in the first light modulation element 11 to the effective pixel area A2 in the second light modulation element 12. Resolutions in the longitudinal and horizontal directions (two orthogonal direction) in the first light modulation element 11 may be quarter as high as those of the second light modulation elements 12 or higher.

Figure 3:
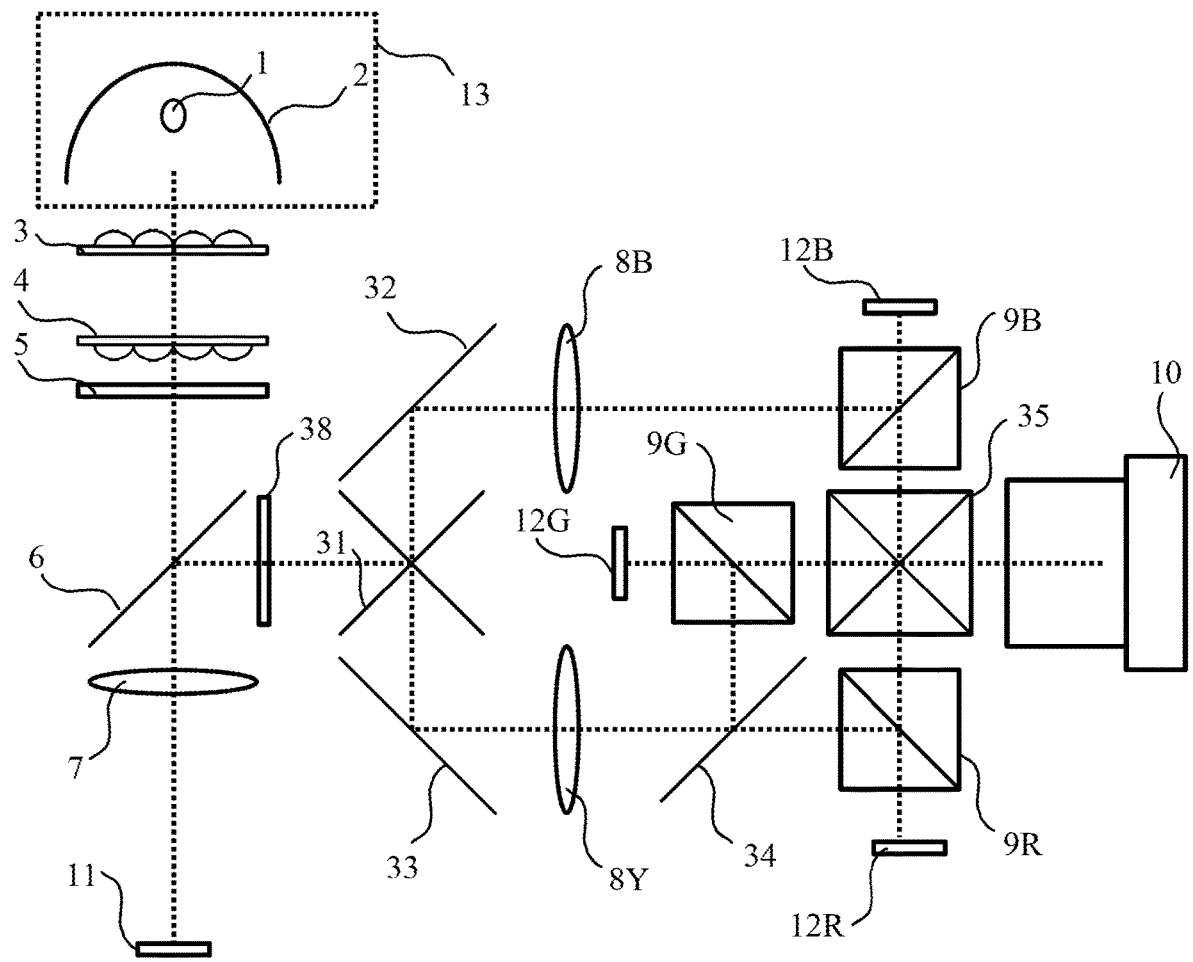
FIG. 3 is a sectional view of a detailed structure of the optical system in a projector according to this embodiment.

While FIG. 1 illustrates the single second light modulation element 12, the actual projector includes three second light modulation elements 12 corresponding to R (red), G (green), and B (blue) colors. The second PBS 9 serves as a color separation and combination optical system that leads the R light, G light, and B light as luminance modulated light fluxes to these three second modulation elements 12. and combines the R light, the G light, and the B light as image light fluxes executes with one another from these three second light modulation elements 12. FIG. 3 illustrates an illustrative color separation and combination optical system.

In FIG. 3, a cross dichroic mirror (color separating element) 31 separates the luminance modulated light (S-polarized light) reflected on the first PBS 6, into first colored light (B light) and second colored light (G light+R light). A polarization plate 38 is located between the first PBS 6 (or the first light modulation element 11) and the cross dichroic mirror 31, and transmits the S-polarized light (and does not transmit the P-polarized light). This polarization plate 38 may use an absorption type polarization plate that absorbs the P-polarized light or a reflection type polarization plate that reflects the P-polarized light, but the absorption type polarization plate can prevent the ghost caused by the reflection of the P-polarized light.

The first colored light is reflected on a first mirror 32, and enters a second light modulation element 12B for the B light via a second lens system 8B and a second PBS 9B for the B light. The first colored light (P-polarized light) as the image light modulated by the second light modulation element 12B transmits the second PBS 9B, is reflected on a cross dichroic prism 35, and is projected onto the unillustrated screen via the projection lens 10.

The second colored light transmits a second lens system 8Y for the Y color, and is separated into third colored light (G light) and fourth colored light (R light) by a dichroic mirror 34. The third colored light enters a second light modulation element 12G for the G light via a second PBS 9G for the G light. The third colored light (P-polarized light) as the image light modulated by the second light modulation element 12G transmits the second PBS 9G, transmits the cross dichroic prism 35, and is projected onto the unillustrated screen via the projection lens 10.

The fourth colored light enters a second light modulation element 12R for the R light via a second PBS 9R for the R light. The fourth colored light (P-polarized light) as image light modulated by the second light modulation element 12R transmits the second PBS 9R, is reflected on the cross dichroic prism 35, and is projected onto the screen by the projection lens 10.

While this embodiment describes the single first light modulation element 11, the first light modulation element may be provided for each of R, G, and B colored light fluxes.

The first PBS 6 according to this embodiment is a wire grid polarization beam splitter (WG-PBS), but may use a prism type PBS. The second PBS 9 according to this embodiment is a prism type PBS but may use the WG-PBS.

The illumination optical system according to this embodiment includes the first fly-eye lens 3 and the second fly-eye lens 4 but may use a rod integrator. In this embodiment, the light modulation elements 11 and 12 use the reflection type liquid crystal panels but may use transmission type liquid crystal panels or a digital mirror devices (DMDs).

When the first light modulation element is a transmission type liquid crystal panel, a polarization plate may be provided in the optical path from the first light modulation element to the second light modulation element. Then, the controller may control the effective pixels and peripheral pixels such that the light from the effective pixels transmits the polarization plate and the polarization plate can absorb or reflect the light from the peripheral pixels.

The first and second light modulation elements may not be of the same types, and for example, the first light modulation element is a transmission type liquid crystal panel and the second light modulation element may be a reflection type liquid crystal panel.

According to this embodiment, a relatively simple structure can reduce the light reflected on the peripheral pixels in the first light modulation element and projected via the second light modulation element.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154904, filed on Aug. 10, 2017, which is hereby incorporated by reference herein in its entirety.

The invention claimed is:

1. An image projection apparatus comprising:
    a first light modulation element configured to modulate a first light emitted from a light source and to generate a second light; and
    a second light modulation element configured to modulate the second light and generate a projection light to be projected on a projection surface,
    wherein the first light modulation element is configured to receive the first light onto a modulable pixel area, the modulable pixel area including an first effective pixel area that generates the second light for modulation by the second light modulation element and a peripheral pixel area arranged at the periphery of the first effective pixel area, and
    wherein the second light modulation element is configured to receive the second light onto a second effective pixel area, and
    wherein the image projection apparatus further comprises a controller configured to control a modulation state of pixels of the peripheral pixel area of the first light modulation element, such that light from the peripheral pixel area of the first light modulation element does not reach the second effective pixel area of the second light modulation element.

2. The image projection apparatus according to claim 1, further comprising an imaging optical system configured to image the second light on the second light modulation element.

3. The image projection apparatus according to claim 1, wherein the first light modulation element is a transmission type liquid crystal panel,
    wherein the image projection apparatus further comprises a polarization plate provided on an optical path from the first light modulation element to the second light modulation element, and
    wherein the controller controls the pixels of the peripheral pixel area such that the polarization plate absorbs or reflects the light from the pixels of the peripheral pixel area.

4. The image projection apparatus according to claim 1, wherein the controller controls the pixels of the peripheral pixel area so as to make the peripheral pixels in a black display state.

5. The image projection apparatus according to claim 1, wherein the first light modulation element is a reflection type liquid crystal panel,
    wherein the image projection apparatus further comprises a polarization separator provided on an optical path from the first light modulation element to the second light modulation element, and
    wherein the controller controls the peripheral pixels such that the light from the peripheral pixels is led to a direction different from the second light modulation element via the polarization separator.

6. The image projection apparatus according to claim 1, further comprising a changer configured to change a position of the first effective pixel area within the modulable pixel area in the first light modulation element.

7. The image projection apparatus according to claim 1, wherein the first light modulation element has resolutions in two orthogonal directions which are quarter as high as those of the second light modulation element or higher.

8. The image projection apparatus according to claim 1, wherein the first effective pixel area in the first modulation element has a shape similar to the second effective pixel area in the second light modulation element.

\* \* \* \* \*